United States Patent [19]
Johanson et al.

[11] 3,915,007
[45] Oct. 28, 1975

[54] REGISTER MEANS FOR DISPLAYING THE ALTITUDE OF AN AIRCRAFT IN AN ALTIMETER

[75] Inventors: Carl E. Johanson; Paul C. Bauer, both of Davenport, Iowa

[73] Assignee: The Bendix Corporation, South Bend, Ind.

[22] Filed: July 20, 1973

[21] Appl. No.: 381,319

[52] U.S. Cl.............. 73/387; 73/432 A; 116/129 T
[51] Int. Cl.[2]..............G01D 13/04; G01D 11/16; G01L 7/14
[58] Field of Search ......... 73/384, 386, 387, 432 A; 116/129 R, 129 T

[56] References Cited
UNITED STATES PATENTS

| | | | |
|---|---|---|---|
| 2,123,376 | 7/1938 | Moeger...................... | 116/129 T X |
| 2,609,691 | 9/1952 | Kirwan......................... | 73/432 A X |
| 2,832,220 | 4/1958 | Logie........................... | 73/387 |
| 2,851,002 | 9/1958 | Angst........................... | 73/386 X |
| 3,069,082 | 12/1962 | Garland et al............... | 116/129 R X |
| 3,191,439 | 6/1965 | Johanson..................... | 73/387 |
| 3,685,360 | 8/1972 | Raznov......................... | 73/387 |
| 3,844,442 | 10/1974 | Puster et al................... | 73/431 X |

Primary Examiner—Richard C. Queisser
Assistant Examiner—Frederick Shoon
Attorney, Agent, or Firm—Leo H. McCormick, Jr.; William N. Antonis

[57] ABSTRACT

A dial display for use in an altimeter wherein a pointer is rotated relative to a first disc which has primary graduations thereon indicative of an altitude above sea level. A second disc has a series of secondary graduations thereon, each of which is equal to the total of the primary graduations, which are visible through a window in the first disc to indicate the relationship between the sensed altitude and sea level. The second disc has a slot therein substantially equal in size to the window in the first disc. A third disc has secondary graduations thereon continuous with those on the second disc which are visible through the slot when the relationship between sea level and the sensed altitude is greater than the altitude indicated by the graduations on the second disc. A resilient member biases the second disc into engagement with the third disc which is proportionally linked by gears to receive the rotative input moving the pointer until a predetermined elevation is sensed after which the graduations on the third disc indicate the elevation.

15 Claims, 3 Drawing Figures

REGISTER MEANS FOR DISPLAYING THE ALTITUDE OF AN AIRCRAFT IN AN ALTIMETER

BACKGROUND OF THE INVENTION

An altimeter is an indicating instrument for measuring the altitude above sea level through the relationship of an air evacuated aneroid and an environment. This relationship is visually presented by the relative position of a long pointer with respect to a base reference point. With each complete revolution of the long pointer a change in elevation of 1,000 feet is measured. Since the operating flight elevation of most aircraft is greater than 1,000 feet, a second pointer was devised to indicate the number of revolutions the long pointer made in reaching the operating elevation. Both pointers were located on the same dial and caused some confusion with the time clock which through a quick glance could be erroneously interpreted as the altitude of the aircraft. To avoid this type of confusion a barrel type indicator, similar to that disclosed in U.S. Pat. No. 2,208,728 was developed and has satisfactorily met the general requirements of the aircraft industry. However, as shown in U.S. Pat. No. 3,191,439 the transmission means required to operate the barrel type altitude indicator display in conjunction with the barometric indicator includes a variety of intermeshing gear each of which must be driven by the altitude sensing aneroids.

SUMMARY OF THE INVENTION

We have devised a registering means for use in an altimeter wherein the transmission of the output from an altitude analyzer is directly transmitted to a pointer means. The pointer means overlies a stationary dial having primary graduations thereon. Simultaneously, the output from the altitude analyzer iss continually and proportionally transmitted to a rotatable first and second sub-dial means. The first and second sub-dials each have secondary graduation thereon which are visible through a window in the secondary dial. Each of the graduations on the first and second sub-dials is equal to the total primary graduations on the stationary dial. The secondary graduations on the first sub-dial extend from a reference point indicative of ground elevation through a predetermined number of secondary graduations adjacent a slot in the first sub-dial substantially equal in size to the window in the stationary dial. The secondary graduations on the second sub-dial are continuous with the secondary graduations on the first sub-dial. A resilient means biases the first sub-dial means into engagement with the second sub-dial means. The second sub-dial means has a gear means which is connected through a reduction gear to the input shaft of the pointer means. The first sub-dial is rotated by the second sub-dial means under the influence of the resilient means in response to the altitude analyzer until a stop is contacted. When the stop is contacted further output from the altitude analyzer will rotate the second sub-dial to bring the corresponding graduation into view in the window in the stationary dial. The stationary dial has a plurality of axial slots which are aligned with corresponding axial slots in the housing for the altimeter. Key means are inserted into the axial slots to maintain the stationary dial in position over a third sub-dial having barometric designations therein visible through another window therein. A manual control is connected to a third sub-dial for correctly placing the present barometric designation in the window of the stationary dial and is connected to the altitude analyzer for modifying the output therefrom to correspondingly move the pointer to the true ground elevation.

It is therefore the object of this invention to provide an indicator with register means for displaying changes in conditions through a series of sequentially graduated dials.

It is another object of this invention to provide an altimeter with a constantly rotatable sub-dial which drives another sub-dial until it engages a stop and thereafter continues to rotate alone in opposition to a resilient means for sequentially displaying changes in altitude.

It is still a further object of this invention to provide an altimeter with register means for displaying changes in altitude measured by a pointer traversing a reference pointer on a stationary first dial means through a rotatable second and third dial means.

It is still a further object of this invention to provide registering means for an indicating device whereon a first disc having graduations thereon is resiliently biased into contact with a second disc having sequential graduations thereon for displaying the output of an input over a wide range.

These and other objects will be apparent from reading the specification and viewing the drawing.

DETAILED DESCRIPTION OF THE PREFERRED EMBODIMENT

Figure 1:
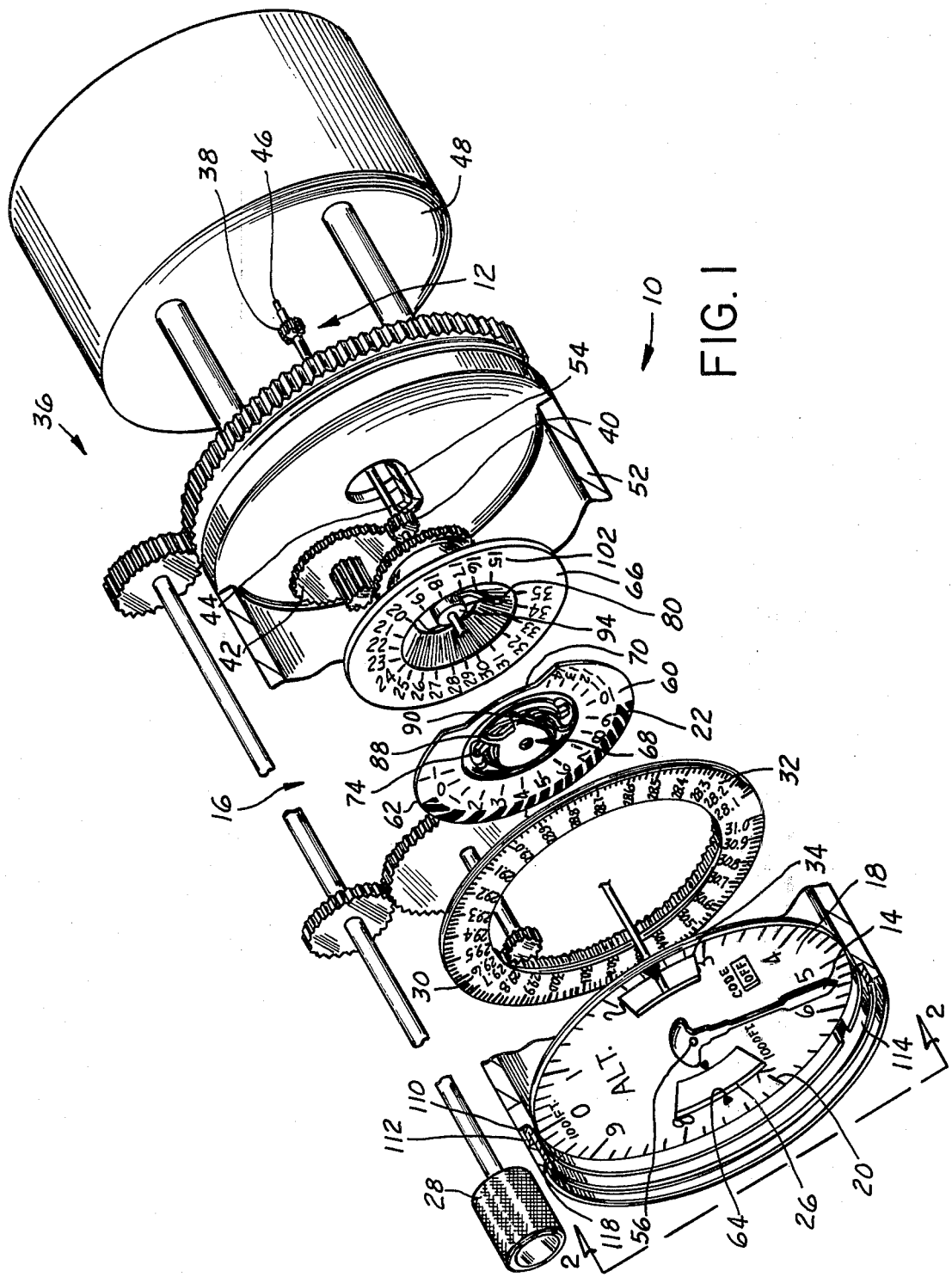
FIG. 1 is an exploded perspective view of an altimeter having a main dial with concentric sub-dials for displaying the altitude of an aircraft with respect to sea level.
Figure 2:
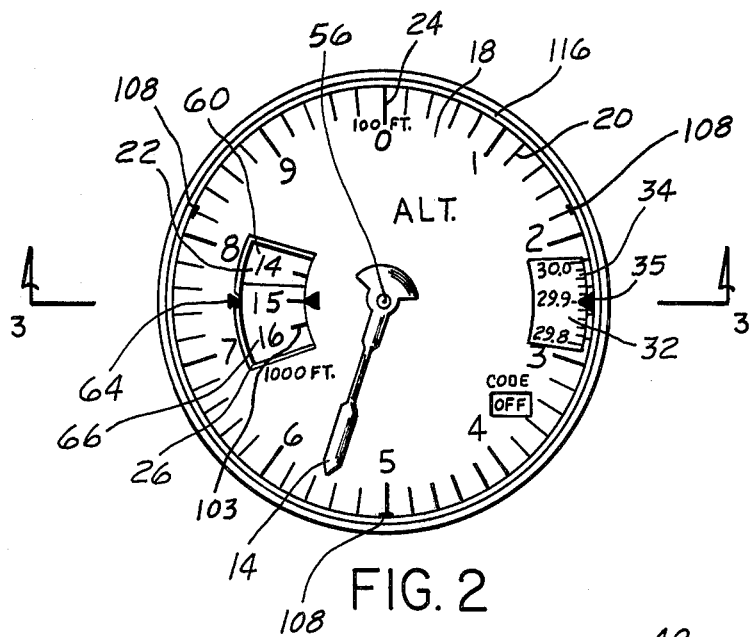
FIG. 2 is a view taken along line 2—2 of FIG. 1 showing the front view of the altimeter.
Figure 3:
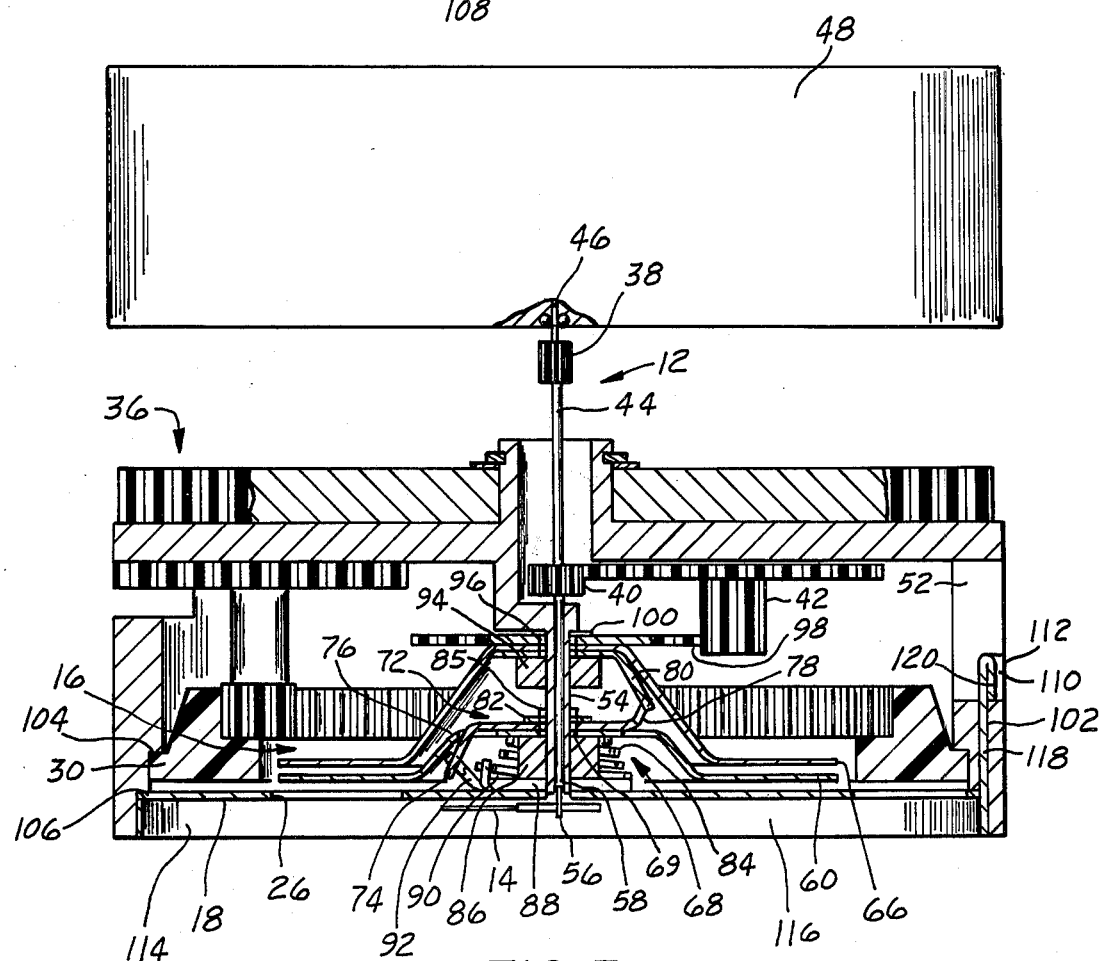
FIG. 3 is a sectional view taken along line 3-3 of FIG. 2.

The altimeter 10 shown in FIG. 1 is a barometric responsive instrument adapted to be associated with an encoder which provides ICAO coded altitude signals to an aircraft transponder. Pneumatic input to the altimeter is associated with the static pressure of the environment surrounding the aircraft. This static pressure is sensed by two opposing aneroids similar to that shown in U.S. Pat. No. 3,191,439, incorporated herein by reference, which expand and contract in response to static pressure changes. The reaction of the aneroids to changes in static pressure is translated into axial rotation of a centrally located rocking shaft (nott shown). The rocking shaft rotation is multiplied by a gear train and transmitted through shaft means 12 to move a single pointer means 14 and sub-dial means 16 such that the altitude indicated is equivalent to the pressure input. The single pointer means 14 which overlies the main dial 18 has indicia thereon of primary graduations 20, such that one thousand feet of altitude is measured for each revolution of the pointer 14. The sub-dial means 16 has indicia thereon of secondary graduations 22, each of which is equal to the total of the primary graduations 20 so that upon the pointer means 14 traversing the base of reference point 24, the number of thousands of feet will be displayed through a window 26 in the main dial 18. A baroset knob 28 is connected to a concentric dial 30 having indicia 32 thereon associated with barometric pressure, i.e., 29.92 at sea level as shown in window 34 of FIG. 2. The baroset knob 28 is connected to the transmission means 36 to provide a modifying input to the shaft means 12 and thereby position pointer 14 at a true elevation above sea level and the sub-dial means 16 at a corresponding pressure indication.

In more particular detail the various elements which are combined to provide registering of changes in altitude for the altimeter 10 will now be described.

The shaft assembly means 12 includes a driven gear 38 for receiving the output from the altitude analyzer means (as shown in incorporated U.S. Pat. No. 3,191,439), a driver gear 40 for transferring a rotative torque to the reduction gear 42, and a stem 44 for directly transmitting the output from the driven gear 38 to the pointer 14. The stem 44 has a first end 46 retained in a jewel bearing in wall 48 and a second end 56 which extends past the main dial 18 onto which the pointer 14 is mounted. A hub or support means 54 attached to the housing 52 surrounds the stem 44 to provide axial alignment for maintaining the pointer 14 in a parallel relationship with the main dial 18. The interior bore of the hub 54 is such that the larger diameter portion 58 of the stem freely rotates without any frictional interference therefrom.

The sub-dial means 16 includes a first disc 60, a second disc 66, and a resilient means 68 for biasing the first disc 60 into engagement with the second disc for a predetermined number of revolutions of the pointer means 14 on the stem 44 in response to rotative torque supplied the driven gear 38 by the altitude analyzer means.

The first disc 60 on which the secondary indicia 22 is placed has a reference point 62 which will be aligned with arrow 64 when the O reference point 24 on the main dial is aligned with the pointer 14 and the baroset dial 32 is positioned at 29.92 in window 34. The first disc 60 has an axial bearing 69 which surrounds hub 54 to maintain the indicia 22 in alignment in window 26. The indicia 22 on the first disc 60 extends past the reference point 62 to include negative numbers to show altitudes below sea level while in the positive range the indicia extends in numerical order to a slot 70. The slot 70 has a width which is substantially equal to the window 26 in the main dial 18.

A keeper means 72 has a first leg 74 which extends through a slot 76 in the first disc 60 and a second leg 78 which engages a projection 80 extending from the second disc 60. A clip 82 is located between a rib 85 on the bearing 69 of the first disc and the keeper 72 to rigidly position the first leg 74 and the second leg 78 in alignment with the reference point 62.

The resilient means 68 includes a coil spring 84 which has one end attached to the first disc 60, a spring guide 86, and a disc 88. The spring guide 86 and the disc 88 surrounds the hub 54 and frictionally engage the same to position the resilient means above the first disc 60. A first side projection 90 extends from disc 88 to engage one end of spring 84 and permit adjustment of the tension through which leg 74 engages a second side projection or stop 92.

The second disc 66 has a bearing means 94, to which the projection 80 is secured, with a sleeve 96 which extends through the second disc 60 to provide a connection for gear 98. A clip 100 is secured in a groove on the sleeve 96 to rigidly hold the gear 98, second disc 96 and bearing 94 together. The projection 80 located on the second disc 66 is such that when leg 74 engages stop 92 the indicia 102 on the second disc 66 will be continuous with the secondary indicia on the first disc as shown in window 26.

The display housing 52 has a first shoulder 104 on which the annular barometric dial 30 is retained for aligning the indicia in the window 34 and a second shoulder 106 on which the main dial 18 is retained over the first and second sub-dials 60 and 66 respectively. The altimeter display housing 52 has a series of slots 103 which extend through the first and second shoulders 104 and 106 into a cavity 110. A cross bore 112 in the side of the altimeter display housing 52 extends into the cavity 110 to provide access thereto. The main dial 18 has a corresponding series of slots 108 located on the periphery thereof in axial alignment with the slots 102 in the altimeter display housing 52.

Key means 114 includes an annular band 116 with tabs 118 which mate with the slots 102 in the housing 52 and slots 108 in the main dial 18 to prevent relative motion between the main dial and the housing 52. The tabs 118 have a hook 120 on the end thereof which snap over a surface in the cavity 110 to rigidly hold the main dial 18 against second shoulder 106.

MODE OF OPERATION OF THE PREFERRED EMBODIMENT

The output from the altitude analyzer means is transmitted through gear 38 to the stem 44 to immediately provide an output which rotates the pointer 14 over the primary graduation on the main dial 18. As gear 38 of the shaft assembly means 12 rotates the pointer 14 in a clockwise direction past the reference point 24, the sub-dial 66 will rotate the sub-dial 60 to present a corresponding numeral in the window 26. As the altitude analyzer means continues to provide a rotative torque in response to a change in altitude, the sub-dial means 16 will continue to record the traversing of the pointer 14 past the reference point. When a predetermined elevation is reached, the altitude analyzer will have supplied sufficient rotative torque to move the slot 70 in alignment with window 26. In this position leg 74 engages stop 92 while side projection 80 moves away from leg 78 to permit the indicia on the second sub-dial 66 to continue to record the traversing of the pointer 14 past the reference point 24.

When the altitude analyzer means senses a decrease in elevation, as during a landing of an aircraft, the rotative torque on the stem 14 will be counterclockwise. The sub-dial 66 will rotate alone, in a counterclockwise direction, until projection 80 engages led 78 and moves the second sub-dial away from the stop 92 in opposition to the spring 84. Thus, as the elevation indicated by the altitude analyzer means is reduced to ground level the sub-dial means 16 will be simultaneously rotated. Upon an operator approaching a landing field, a ground controller will supply a barometric indication which is manually placed on dial 32 through knob 28. At the same time gear 122 will supply transmission means 36 with a modifying input to correct the output from the altitude analyzer means and display a true elevation on dial 18 with respect to point 14 to correct the display of the indicia 22 on sub-dial 60 with respect to the arrow 64 and to correct the indicia 22 on sub-dial 32 with respect to arrow 35 to provide the operator with an absolute elevation above sea level at that particular time.

We claim:

1. In an indicating instrument having a housing in which a shaft means transmits an input force to a pointer overlying a first dial means having a predetermined number of primary graduations thereon which are representative of altitude, registering means for displaying condition changes with respect to a base position on the first dial means when the pointer repeatedly traverses the base position in response to the input force, said registering means comprising:
   support means fixed to said housing and surrounding said shaft means for maintaining said pointer in a parallel relationship with said first dial means;
   second dial means positioned on said support means concentric to and in a plane parallel to said first dial means having a plurality of secondary graduations thereon visible through a window in the first dial means, each of said secondary graduations being equal to the total number of primary graduations on the first dial means, said secondary graduations on the second dial means extending from a reference position corresponding to said base position on the first dial means to a slot in the second dial means;
   third dial means positioned on said support means concentric to and in a plane parallel to said second dial means and having secondary graduations thereon sequentially continuous with the secondary graduations on the second dial means, said third dial means being adapted to be visible through said slot in said second dial means;
   transmission means connected to said shaft means for conveying a proportional rotational torque to said third dial means in response to said input force;
   a spring having a first end and a second end, said first end being attached to said second dial means;
   disc means secured to said support means for providing a guide to support said spring; and
   adjustment means extending from said disc means for engaging said second end of said spring, said adjustment means controlling the resiliency of the spring to urge the second dial means against the third dial means and thereby provide continuity for the secondary graduations thereon, said transmission means responding to said input force to simultaneously rotate said second and third dial means in opposition to the resiliency of said spring to allow said secondary graduations on the second dial means to be displayed through said window in the first dial means until the second dial means engages the adjustment means, said spring holding said second dial means against said adjustment means to align said slot in the second dial means with said window in the first dial means and thereby permit the sequential graduations on the third dial means to be presented through the slot in the second dial means and the window in the first dial means in response to further rotative torque transmitted through the transmission means.

2. The indicating instrument, as recited in claim 1, wherein said support means includes:
   a stem located in a cylindrical bore of said support means having one end journaled in said housing and the other end extending past said first dial means for mounting said pointer; and
   first gear means located on said stem and directly responsive to said input force for positioning said pointer over the primary graduations on the first dial means corresponding to an altitude.

3. The indicating instrument, as recited in claim 2 wherein, said second dial means includes:
   first bearing means surrounding said support means for maintaining the second graduations on the second dial means in alignment with the first window in the first dial means;
   spacer means secured to said first bearing means having a first arm for engaging said third dial means and a second arm for engaging said stop; and
   keeper means secured to said first bearing for holding said spacer means securely to said second dial means.

4. The indicating instrument, as recited in claim 3, wherein said third dial means includes:
   second bearing means surrounding said hub for maintaining the sequential graduation on the third dial means in alignment with said slot in the second dial means and the first window in the first dial means;
   projection means surrounding said second bearing means for engaging the first arm of the spacer means;
   second gear means surrounding said second bearing means for engaging the transmission means; and
   clip means snapped on to said second bearing means for holding said second gear means securely to the third dial means.

5. The indicating instrument, as recited in claim 4, wherein said transmission means includes:
   third gear means for reducing the rotational torque available at the stem and supplying this reduced rotational torque to said second gear means to continually rotate the third dial means as a function of the input force.

6. The indicating instrument, as recited in claim 1, wherein said indicating instrument further includes:
   fourth dial means concentric to said second and third dial means with indicia thereon representative of changes in conditions which effect the input force, said indicia being visible through a second window in the first dial means; and
   control means connected to said fourth dial means and said pointer for selecting said base position as a direct function of said conditions.

7. The indicating instrument, as recited in claim 6, wherein said housing of the indicating instrument includes:
   a first annular shoulder concentric to said fourth dial means for maintaining said indicia thereon in alignment with a second window in the first dial means.

8. The indicating instrument, as recited in claim 7, wherein said housing of the indicating instrument further includes:
   a second annular shoulder concentric to said first annular shoulder for positioning the first and second windows in said first dial means over the secondary graduations on the second and third dial means and the indicia on the fourth dial means, respectively, said housing having a plurality of axial slots perpendicular to said first and second annular shoulders, said first dial means having a corresponding series of slots therein; and
   key means located in said axial slots in the housing and first dial means to prevent relative motion therebetween.

9. The indicating instrument, as recited in claim 8, wherein said key means includes:

tab means on the end of the key means which project into corresponding transverse slots in the housing for securing the first dial means to the housing.

10. In an altimeter having a housing with a support means fixed thereto for retaining a shaft means through which the output of an altitude analyzer means is transmitted to a pointer associated with a first disc means, having a predetermined number of primary graduations thereon representative of the altitude corresponding to the output above a reference point, registering means for recording the relationship between the altitude and a base altitude upon the pointer repeatedly traversing the reference point upon the relationship exceeding the total of the primary graduations on the first disc means, said registering means comprising:

second disc means surrounding and rotatable on said support means having a plurality of secondary graduations thereon visible through a window in the first disc means, each of the secondary graduations being equal to the total number of primary graduations, said secondary graduations extending from said reference point to a slot in said second disc means, said support means maintaining said second disc means in a plane parallel to said first disc means;

third disc means surrounding and rotatable on said support means having secondary graduations thereon sequentially continuous with those on the second disc means and adapted to be visible through the slot in said second disc means, said support means maintaining said third disc means in a plane parallel to said second disc means;

linkage means connected to said shaft means for conveying a proportional rotative torque to said third disc means in response to the output of the altitude analyzer means;

a spring having a first end and a second end, said first end being attached to said second disc means;

guide means secured to said support means for supporting the spring; and adjustment means extending from said guide means for engaging the second end of the spring, said adjustment means controlling the resiliency of the spring which biases the second disc means against the third disc means to provide continuity for the secondary graduations thereon, said linkage means responding to said output of the altitude analyzer means to simultaneously rotate said second and third disc means in opposition to the resiliency of the spring to allow said secondary graduations on the second disc means to be displayed through said window in the first disc means until the second disc means engages the adjustment means, said spring holding said second disc means against said adjustment means to align the slot in the second disc means with said window in the first disc means and thereby permit the sequential graduations on the third disc means to be presented through the slot in the second disc means and the window in the first disc means in response to any further rotative torque transmitted through the linkage means.

11. The altimeter, as recited in claim 10, wherein said shaft means includes:

a stem retained in said support means having a driven gear directly connected to said altitude analyzer means for positioning said pointer over the primary graduations on the first disc means.

12. The altimeter, as recited in claim 11, wherein said second disc means includes:

first bearing means located on said support means for aligning said secondary graduation with the first window, said first bearing means having a side projection for engaging the third disc in response to the relative torque of said resilient means.

13. The altimeter, as recited in claim 12, wherein said third disc means includes:

second bearing means located adjacent the first bearing means on the support means for aligning the sequential graduations with the slot in the window in the first disc means, said second bearing means having a tab which is engaged with the projection on the first bearing means during said simultaneous rotation; and gear means attached to said third disc means for receiving the torque from said linkage means to move the corresponding secondary graduation into alignment with the first window in the first disc means.

14. The altimeter, as recited in claim 13, wherein said housing includes:

a first annular shoulder concentrically larger than said second disc means;

fourth disc means located on said first annular shoulder having indicia thereon representing conditions affecting the indicated base altitude, said indicia being visible through a second window in the first disc; and control means connected to said fourth disc means and said linkage means to allow an operator to modify the output of the altitude analyzer means by changing the indicia visible in the second window to match the then present environment condition.

15. The altimeter, as recited in claim 14, wherein said housing further includes:

a second annular shoulder concentrically larger than said first annular shoulder, said second annular shoulder having a series of axial slots therein with a groove at the bottom thereof, said first dial means having corresponding axial slots therein; and key means associated with said axial slots to prevent relative movement between the first disc means and the housing, each of said key means having a lip on the end thereof which is adapted to be resiliently positioned in said groove to retain the first disc means on said second shoulder.

* * * * *